United States Patent
Campbell et al.

(10) Patent No.: US 10,677,292 B2
(45) Date of Patent: Jun. 9, 2020

(54) GENERATOR DISCONNECT COUPLINGS

(71) Applicant: Hamilton Sundstrand Corporation, Charlotte, NC (US)

(72) Inventors: Kris H. Campbell, Poplar Grove, IL (US); Jonathan C. Dell, Carpentersville, IL (US); Shin Katsumata, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 902 days.

(21) Appl. No.: 15/294,620

(22) Filed: Oct. 14, 2016

(65) Prior Publication Data

US 2018/0106302 A1 Apr. 19, 2018

(51) Int. Cl.
| | |
|---|---|
| F16D 23/12 | (2006.01) |
| F16D 11/04 | (2006.01) |
| F16D 23/02 | (2006.01) |
| F16D 48/06 | (2006.01) |

(52) U.S. Cl.
CPC .............. *F16D 23/12* (2013.01); *F16D 11/04* (2013.01); *F16D 23/02* (2013.01); *F16D 48/06* (2013.01); *F16D 2023/123* (2013.01); *F16D 2500/10462* (2013.01); *F16D 2500/3021* (2013.01); *F16D 2500/30408* (2013.01)

(58) Field of Classification Search
CPC . F16D 2500/30408; F16D 11/02; F16D 11/08
See application file for complete search history.

(56) References Cited

U.S. PATENT DOCUMENTS

| | | | |
|---|---|---|---|
| 4,945,780 A | 8/1990 | Bosma | |
| 5,109,969 A * | 5/1992 | Blaser | B41F 13/0008 192/103 R |
| 2005/0236248 A1 | 10/2005 | Joki | |
| 2010/0283341 A1* | 11/2010 | Grosskopf | F01D 5/026 310/78 |
| 2012/0024652 A1 | 2/2012 | Ishii et al. | |
| 2013/0112522 A1* | 5/2013 | Granzow | F16H 63/304 192/69.9 |
| 2013/0262025 A1* | 10/2013 | Gronli | H02P 6/16 702/151 |
| 2015/0362027 A1* | 12/2015 | Ebuchi | F16D 11/10 188/69 |
| 2017/0298996 A1* | 10/2017 | Mayr | B60K 17/3462 |

OTHER PUBLICATIONS

Extended European Search Report received from the European Patent Office (EPO) dated Mar. 7, 2018 for Application No. EP17195545.3.

* cited by examiner

*Primary Examiner* — Timothy Hannon
(74) *Attorney, Agent, or Firm* — Locke Lord LLP; Scott D. Wofsy; Georgi Korobanov (57) ABSTRACT

A method of disconnecting a generator from a source of mechanical rotation includes receiving a generator disconnect command and receiving a rotational position of a generator input member. The input member rotational angle is compared to the target disconnect angle range, and a determination made whether to disconnect the input member from a generator drive member based on the comparison.

12 Claims, 6 Drawing Sheets

GENERATOR DISCONNECT COUPLINGS

BACKGROUND OF THE INVENTION

1. Field of the Invention

The present disclosure generally relates to couplings, and more particularly to disconnect couplings for generators such as in aircraft electrical systems.

2. Description of Related Art

Generators, such as in aircraft electrical systems, commonly include a rotor connected to an engine and supported for rotation relative to a stator. The rotor generally carries magnets or windings which generate a magnetic field. The stator generally has windings arranged such that, as the rotor rotates relative to the stator, interaction of the magnetic field and stator windings induces electrical current in the stator windings, which the generator provides to the electrical system as electrical power for devices connected to the generator through the electrical system.

In some electrical systems it can be desirable to mechanically disconnect the generator from the source of mechanical rotation, thereby reducing load on the engine. For example, in aircraft, disconnecting the generator from the engine can free engine power for other needs or to reduce fuel consumption. Some generators therefore include a clutch assembly that couples the generator to the engine and which can be selectively engage to disconnect the generator from the engine. Such clutch assemblies have components that frictional engage one another, potentially wearing and/or generating debris within the clutch assembly. The wear and/or debris can be managed by periodically clutch servicing, e.g., fluid changes; wear part replacement; etc.

Such conventional methods and systems have generally been considered satisfactory for their intended purpose. However, there is still a need in the art for improved disconnect couplings, generator arrangements, and methods of disconnecting generators from engines. The present disclosure provides a solution for this need.

SUMMARY OF THE INVENTION

A method of disconnecting a generator from a source of mechanical rotation includes receiving a generator disconnect command and receiving a rotational position of a generator input member. The input member rotational angle is compared to the target disconnect angle range, and a determination made whether to disconnect the input member from a generator drive member based on the comparison.

In certain embodiments, separating the input member from the drive member can include frictionally engaging the input member while rotating with an actuator fixed relative to the input member. Separating the input member from the drive member can include delaying separation of the input member from the drive member. The delay can correspond to the rotational position of the input member. The delay corresponds to a predetermined delay interval.

In accordance with certain embodiments, the separation of the input member from the drive member can be delayed when the input member rotational angle is outside of the target disconnect angle range. The input member can be disconnected from the input member when the input member rotational position is within the target disconnect angle range. It is contemplated that the input member can be disconnected from the drive member subsequent to tolling the delay interval, irrespective of the rotational position of the input member.

A disconnect coupling includes a drive member, an input member defining a rotation axis and having a ramp extending circumferentially about the input member, an actuator member, and a controller. The actuator member is angled relative to the ramp and is movable between a disengaged position, wherein the actuator member is mechanically disconnected from the input member, and an engaged position and the input member is rotationally fixed to the drive member, and an engaged position, wherein the actuator member is in mechanical contact with the input member and the input member is rotationally free relative to the drive member. The controller is operably connected to the actuator member to cause the actuator member to move the actuator member between the disengaged and the engaged positions according to rotational position of the input member.

In certain embodiments, the controller can be configured to execute the operations of the methods described above. An angular position sensor can be connected to the controller and configured to provide a signal with input member rotational position to the controller. An actuation module can be connected between the controller and the actuator member to move the actuator member between the disengaged position and engaged positions upon receipt of a disconnect command.

In accordance with certain embodiments, the controller can include a disconnect command lead. A synchronization block can be connected to the disconnect command lead. A delay block can be connected to the disconnect command lead. An operator block can be connected to the synchronization block and the delay block to provide a disconnect command received from the synchronization block or the delay block to an actuation module connected to the actuator member based on input member rotational angle or toll of a delay interval.

It is also contemplated that, in accordance with certain embodiments, a reduction gear arrangement can be mechanically coupled to the drive member to providing mechanical rotation to the input member. A prime mover, such as a gas turbine, can be mechanically coupled to the drive member to provide mechanical rotation to the input member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
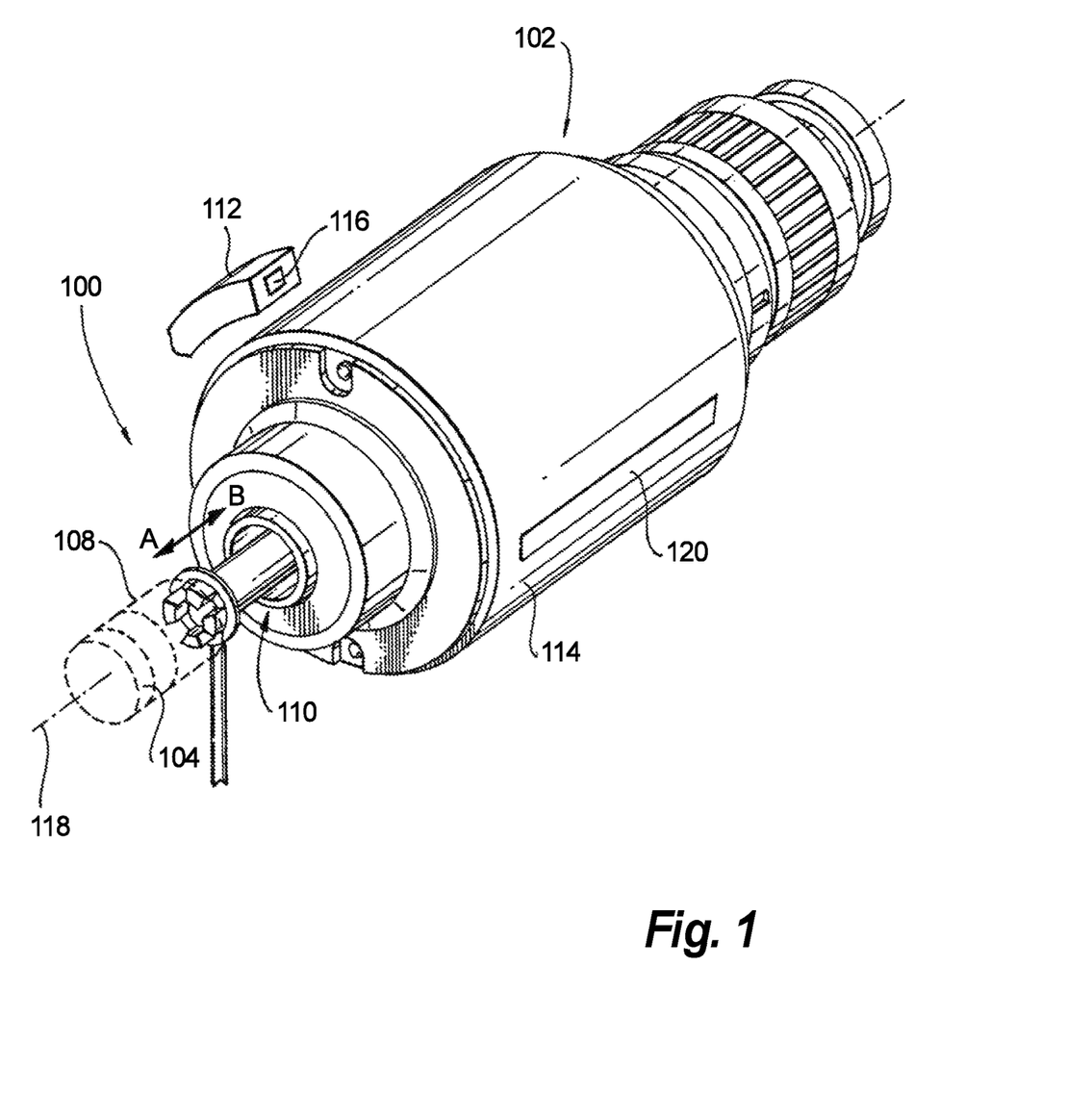
FIG. 1 is a perspective view of an exemplary embodiment of a generator arrangement constructed in accordance with the present disclosure, showing a generator rotor connected to a gas turbine engine by an input member.

Reference will now be made to the drawings wherein like reference numerals identify similar structural features or aspects of the subject disclosure. For purposes of explanation and illustration, and not limitation, a partial view of an exemplary embodiment of a disconnect coupling in accordance with the disclosure is shown in FIG. 1 and is designated generally by reference character 100. Other embodiments of disconnect couplings, generator arrangements, and methods of disconnecting generators from sources of mechanical rotation in accordance with the disclosure, or aspects thereof, are provided in FIGS. 2-7, as will be described. The systems and methods described herein can be used for disconnecting generators from engines in aircraft electrical systems, though the present disclosure is not limited to aircraft electrical systems or to generators in general.

Referring to FIG. 1, a generator arrangement 102 is shown. Generator arrangement 102 is operably connected to a prime mover, e.g., a gas turbine engine 104, by a reduction gear arrangement and disconnect coupling 100 including a drive member 108 and an input member 110. Generator arrangement 102 includes a stator portion 112 with stator windings 116 for providing electrical power to an aircraft electrical system (not shown for purposes of clarity) and rotor portion 114. Rotor portion 114 is supported for rotation relative to stator portion 112 about a rotation axis 118 and includes permanent magnets, bars, and/or windings 120, which are electromagnetically coupled to stator windings 116 for inducing electrical current in stator windings 116 as rotor portion 114 rotates relative to stator portion 112 about rotation axis 118.

Input member 110 is slidingly received within rotor portion 114 along rotation axis 118 and is movable along rotation axis 118 between a connected position A and a disconnected (i.e. separated) position B relative to prime mover 104, gear arrangement, and drive member 108. In the connected position A, input member 110 is fixed in rotation relative to drive member 108, input member 110 receiving mechanical rotation 122 (shown in FIG. 2) from drive member 108 such that rotor portion 114 and input member 110 rotate in concert with one another about rotation axis 118. In the disconnected position B, input member 110 is rotationally free relative to drive member 108, input member 110 being axially disconnected from drive member 108 such that input member 110 and rotor portion 114 may be rotationally fixed relative to stator portion 112.

Figure 2:
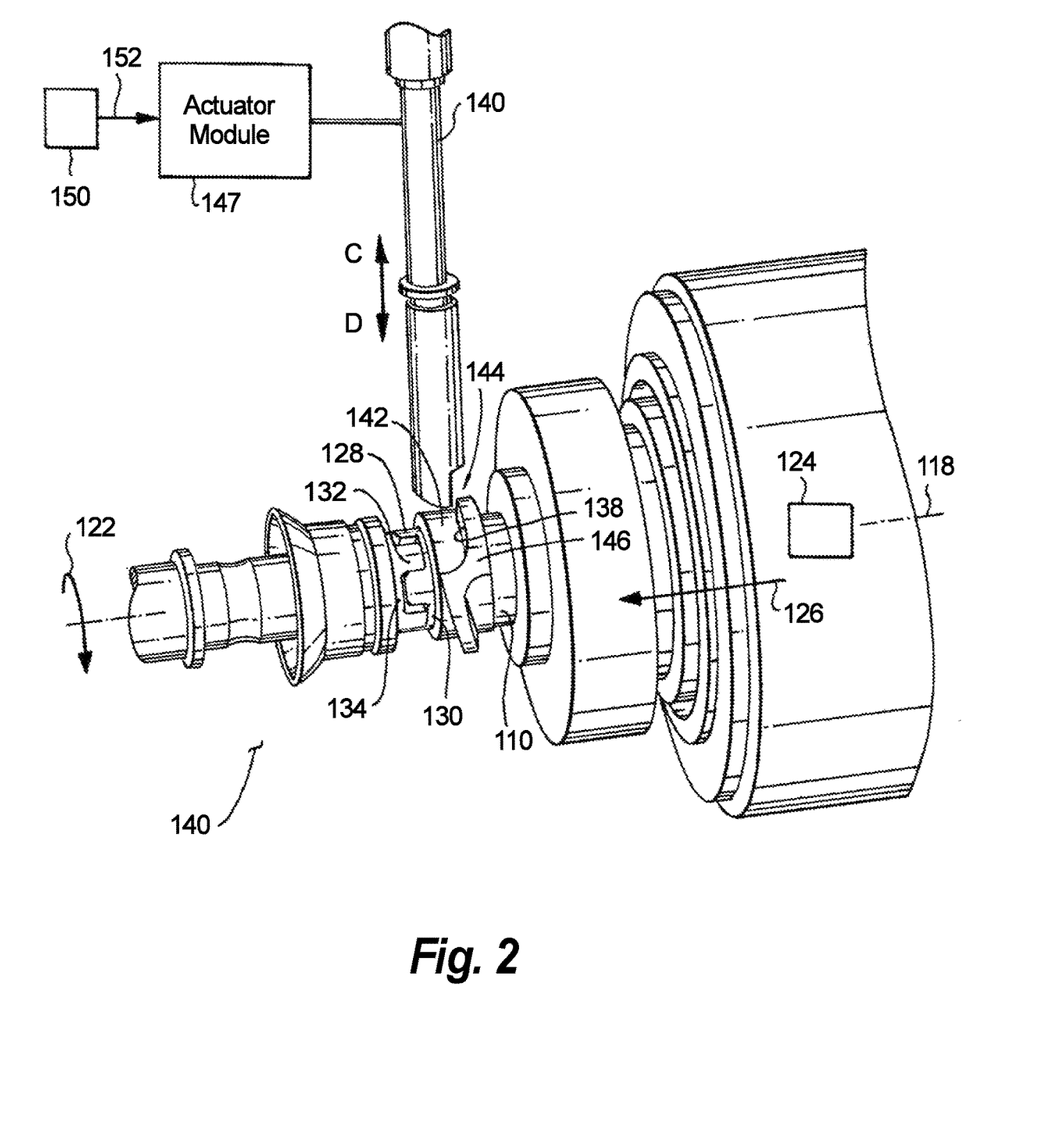
FIG. 2 is a cross-sectional side view of the generator arrangement of FIG. 1, showing an actuator member engaging an input member ramp to disconnect the generator from the gas turbine engine.

With reference to FIG. 2, a biasing element 124 is arranged to exert a biasing force 126 axially on input member 110. Biasing force 126 urges input member 110 axially along rotation axis 118, towards drive member 108, such that face teeth 128 disposed on a face 130 of input member 110 intermesh with corresponding face teeth 132 disposed on an opposing face 134 of drive member 108. As will be appreciated by those of skill in the art in view of the present disclosure, mechanical rotation 122 is communicated between drive member 108 (shown in FIG. 1) and input member 110 when drive member face teeth 132 intermesh with input member face teeth 128, biasing force 126 biasing operating to urge input member 110 towards connected position A (shown in FIG. 1) such that the teeth of input member 110 and drive member 108 are intermeshed.

Input member 110 includes a ramp 136 disposed on an end proximate to face teeth 128. Ramp 136 extends about input member 110 and rotation axis 118, defining a cam surface 138. Cam surface 138 has an actuator member-receiving surface extending about a portion of the circumference of input member 110 which, from the perspective of a rotationally fixed actuator member 140, has an axial position that varies according to the rotational position of input member 110. Cam surface 138 bounds a recess 142 for receiving an actuator member end 144 of actuator member 140, recess 142 being interrupted by an axially extending rib portion 146. Actuator member 140 is mechanically engagable with input member 110 such rotation of the input member 110 while the actuator member is mechanically engaged with input member 110 causes input member 110 to move axially away from and to thereby rotationally disengage from drive member 108.

An actuator module 147 is operably connected to actuator member 140. Actuator module 147 is arranged to move actuator member 140 between a disengaged position C, wherein actuator member 140 is mechanically disconnected from input member 110, and an engaged position D, wherein actuator member 140 is in mechanical contact with input member 110. Upon receipt of a disconnect command signal 152, actuator module 147 moves actuator member 140 from the disengaged position C to the engaged position D, wherein actuator member end 144 will generally be received into recess 142.

As will be appreciated by those of skill in the art in view of the present disclosure, within a relatively limited angular range of rotation, axially extending rib portion 146 can be aligned with actuator member 140. When within this angular range actuator member end 144 can impact axially extending rib portion 146, potentially sliding across the surface of input member 110 in frictional engagement with the surface of input member 110 prior to seating within recess 142. The impact as well as the frictional forces associated with the sliding can cause actuator member end 144 to generate debris, e.g., chips 148, from input member 110. Chips 148 can reduce reliability or availability of generator arrangement 102 if not managed, such as by removal, e.g., through lubricant fluid changes, and/or through impoundment, e.g., in a lubricant filter, etc. Accordingly, to reduce (or eliminate) chip generation, generator arrangement 100 includes a controller 150 for synchronizing movement of actuator member 140 from the disengaged position C according to rotational position of input member 110 such that actuator member end 144 does not impact rib portion 146.

Figure 3:
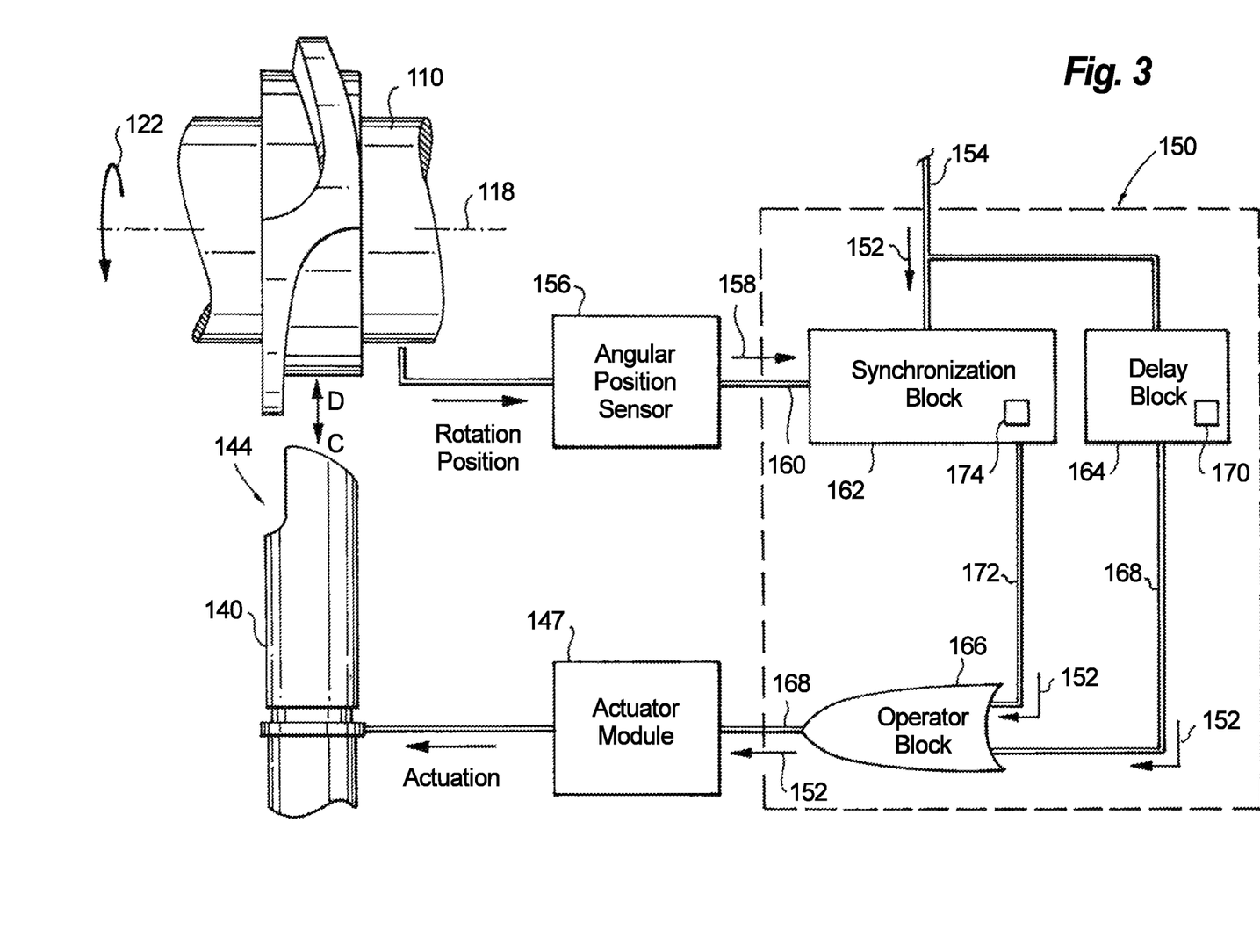
FIG. 3 is a schematic view of a controller of the generator arrangement of FIG. 1, showing the controller synchronizing issue of a disconnect command to an actuator module based on rotational position of the input member.

With reference to FIG. 3, controller 150 is shown. Controller 150 is connected between actuator module 147 and a disconnect command lead 154, and is arranged to synchronize receipt of disconnect command signal 152 at actuator module 147 with rotational position of input member 110. A position sensor 156 coupled to input member 110 is configured to report rotational position of input member 110 with a rotational position signal 158. Position sensor 156 provides rotational position signal 158 to controller 150 through a sensor lead 160. Rotational position signal 158 may be a 'pull', triggered by receipt of disconnect command signal 152 by controller 150. Alternatively, rotational position signal 158 may be a 'push', provided continuously by position sensor 156 irrespective of presence of disconnect command signal 152 on disconnect command lead 154.

Controller 150 includes a synchronization block 162, a delay block 164, and an operator block 166. Sensor lead 160 is connected to synchronization block 162 and is configured to provide rotational position signal 158 to synchronization block 162. Disconnect command lead 154 is connected to both synchronization block 162 and delay block 164, and is configured to provide disconnect command signal 152 to both synchronization block 162 and delay block 164 simultaneously. Delay block 164 is connected to operator block 166 by a delay block output lead 168, and is arranged to toll a delay interval 170 of predetermined duration upon receipt of disconnect command signal 152, and thereafter provide disconnect command signal 152 to operator block 166.

Synchronization block 162 is connected to operator block 166 by a synchronization block output lead 172, and is arranged to provide disconnect command signal 152 to operator block 166 in synchronization with rotational position of input member 110. In this respect synchronization block 162 is arranged to compare rotational position of input member 110, as indicated by rotational position signal 158, with a predetermined target disconnect angle range (or window) 174. When rotational position signal 158 is outside target disconnect angle range (or window) 174, synchronization block 162 refrains from providing disconnect command signal 152 to operator block 166. When rotational position signal 158 is within target disconnect angle range (or window) 174, synchronization block 162 provides disconnect command signal 152 to operator block 166. As will be appreciated by those of skill in the art, the target disconnect angle range varies with rotor speed for a given actuator member movement speed and distance. Thus, as generator rotational speed increases, the likelihood of generating chips increases.

Operator block 166 is connected to actuator module 147 via an actuator module input lead 168, and is arranged to provide a disconnect command signal 152 to actuator module 147 without discrimination. In this respect operator block 166 is arranged to provide disconnect command signal 152 to actuator module 147 via actuator input module lead 168 when provided by either delay block 164 or synchronization block 162. Therefore, when a disconnect command is issued to controller 150, such as from a user input arranged on aircraft flight deck by way of non-limiting example, arrival of the command signal at actuator module 147 is delayed by a relatively short period of time (e.g., the amount of time required to for recess 142 to become align with actuator member end 144), actuator module 147 thereafter receiving disconnect command signal 152. It is contemplated that delay interval 170 be selected to correspond to a relatively short period of times, e.g., to one or two revolutions of input member 110 when rotation 122 about rotation axis 118 is about 24000 rotations per minute. Thereafter, in the event that synchronization block 162 fails to provide disconnect command signal 152 within the relatively longer delay interval 170, the delay interval tolls (i.e. the delay expires), and disconnect command signal 152 is provided through operator block 166 by delay block 164 such that actuator member 140 drives actuator member end 144 from disengaged position C to engaged position D.

Figure 4:
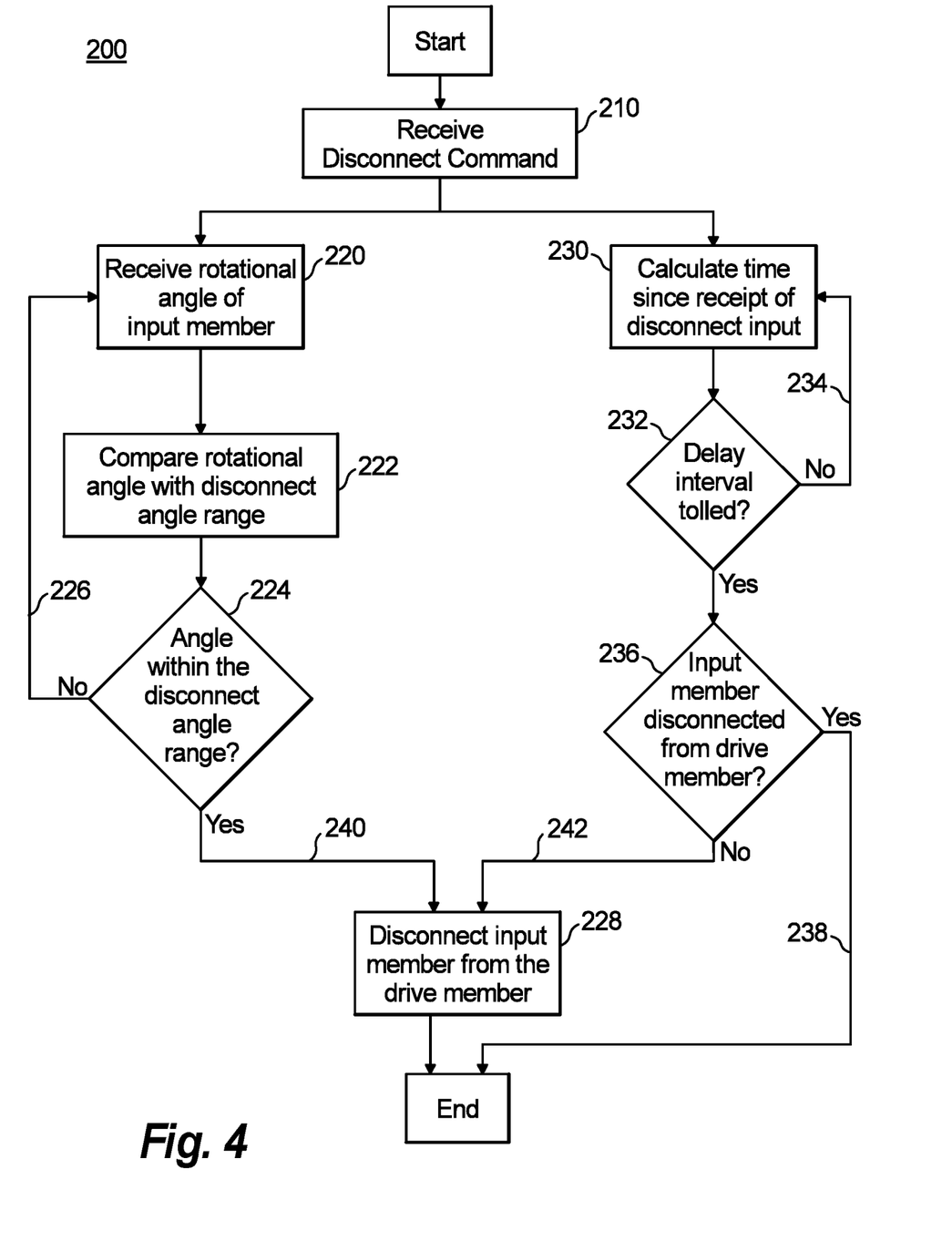
FIG. 4 is a flowchart of a method of disconnecting the generator and gas turbine engine in the generator arrangement of FIG. 1, showing determinations made when a disconnect command is issued to a controller in the generator arrangement.

With reference to FIG. 4, a flowchart of a method 200 of disconnecting a generator, e.g., generator arrangement 102 (show in FIG. 1), from a drive member, e.g., gas turbine engine 104 (shown in FIG. 1), is shown. Method 200 includes receiving a disconnect command, e.g., disconnect command signal 152 (shown in FIG. 2), to disconnect the generator from a source of mechanical rotation, as shown with box 210. A rotational angle of an input member, e.g., input member 110 (shown in FIG. 1) is received, as shown with block 220, and compared with an input member target disconnect angle range, e.g., target disconnect angle range 174 (shown in FIG. 3), as shown with box 222. Determination is then made whether the input member rotational angle is within the target disconnect angle range, as shown with box 224.

In the event that the input member rotational angle is not within the target disconnect angle range then the input member rotational position is monitored until it is within the target disconnect angle range, as shown with arrow 226. In the event that the input member rotational position is within the target disconnect angle range, the input member is disconnected from the drive member by providing the disconnect command to an actuation module, e.g., actuator module 147 (shown in FIG. 2), as shown with box 228 and indicated with arrow 240.

Coincident with operations 220 through 224/226, a delay interval is tolled. In this respect the intervening period of time between receipt of the disconnect command is calculated, as shown with box 230. Duration of the intervening period is compared with a predetermined delay interval, e.g., delay interval 170 (shown in FIG. 3), as shown with box 232. In the event that the calculated intervening period is not within the delay interval, time since receipt of the disconnect command is successively re-calculated until the intervening period exceeds the delay interval the delay interval thereby being tolled, as shown with arrow 234.

Once the delay interval has tolled, determination is made as to whether the input member has been disconnected from the drive member, as shown with box 236. In the event that the input member has been disconnected via issue of the disconnect command to the actuation module via step 224, the process ends as, shown with arrow 238. In the event that no disconnect command has yet been issued to the actuation module, the disconnect command is issued to the actuation module, as shown with arrow 242.

Figure 5:
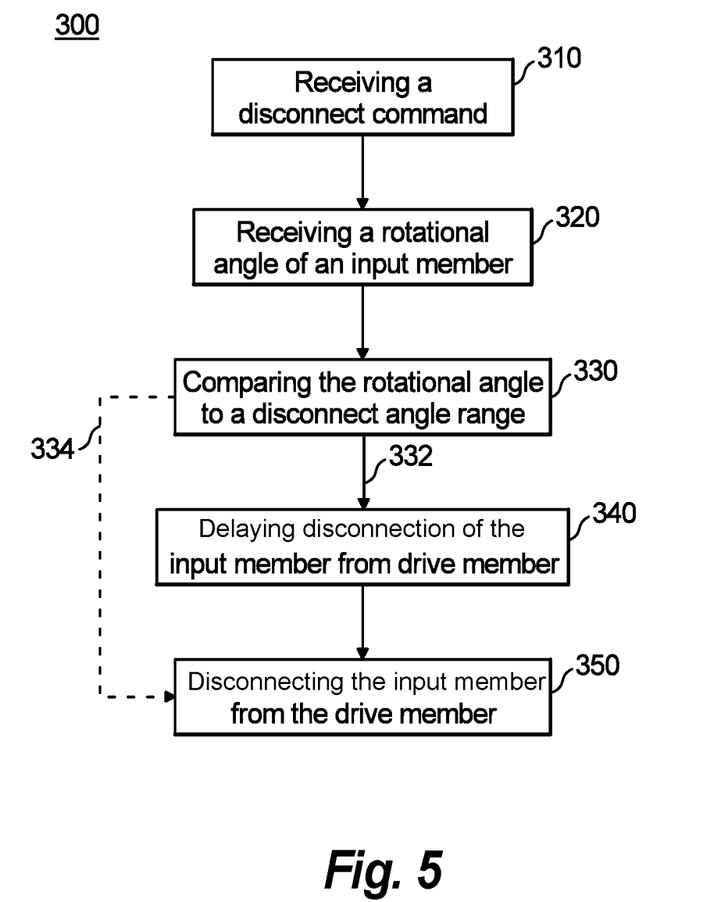
FIGS. 5-7 are process flow diagram of an exemplary embodiment of a method of disconnecting a generator input member from a source of mechanical rotation, showing steps of the method.
Figure 6:
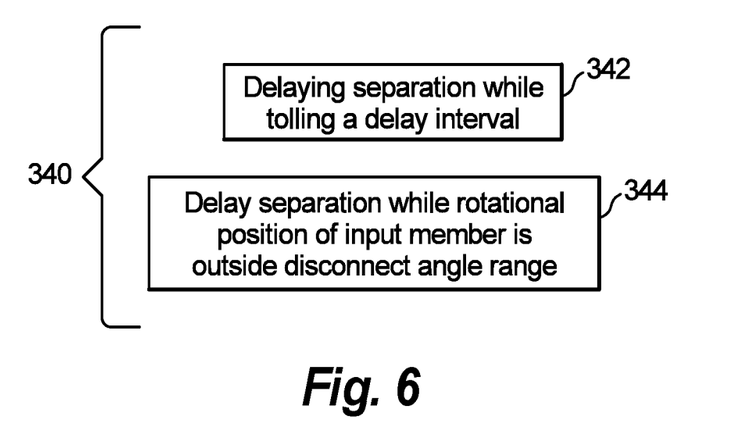
Figure 7:
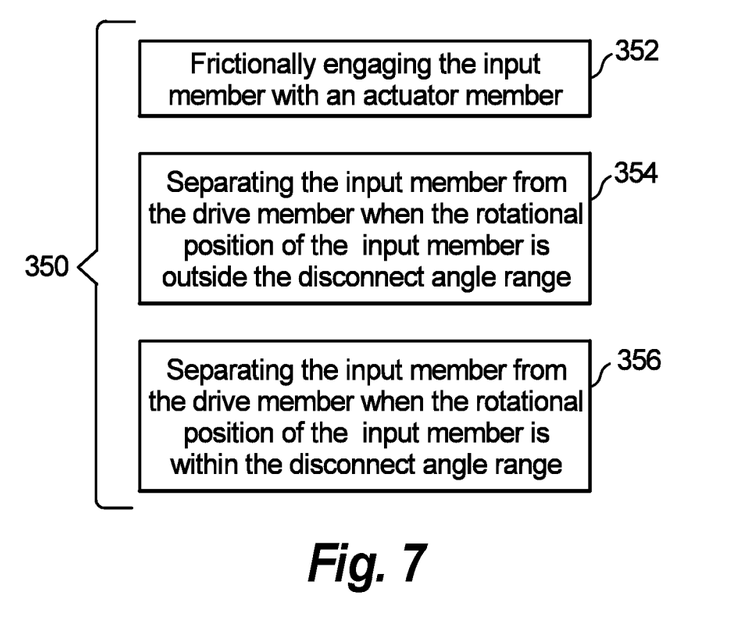

With reference to FIGS. 5-7, an exemplary embodiment of a method 300 of disconnecting a generator, e.g., generator arrangement 102 (shown in FIG. 1), from a source of mechanical rotation, e.g., gas turbine engine 104 (shown in FIG. 1), is shown. Method 300 includes receiving a disconnect command, e.g., disconnect command signal 152 (shown in FIG. 2), as shown with box 310. Method 300 also includes receiving a rotational angle of an input member, e.g., input member 110 (shown in FIG. 1), a shown with box 320.

The rotational angle is compared to a target disconnect angle range, e.g., target disconnect angle range 174 (shown in FIG. 3), as shown in box 330. Based on the comparison, separation of the input member and drive member can be delayed, as shown with box 340 and indicated by arrow 332. Separation of the input member from the drive member can be delayed until toll of a delay interval, e.g., delay interval 170 (shown in FIG. 3), as shown with box 342. Separation of the input member from the drive member can be delayed until the rotational angle of the input member is within the target disconnect angle range, as shown with box 344. Alternatively, in the event that the rotational position is suitable for disconnect, e.g., bridge 146 (shown in FIG. 2) is not within the stroke of actuator member end 144 (shown in FIG. 2), the input member can be disconnected from the drive member, as show with box 350 and indicated with arrow 334.

The input member is be disconnected from the drive member by frictionally engaging the input member with an actuator member, e.g., actuator member 140 (shown in FIG. 2), as shown with box 352. Separation can occur when the comparison indicates that the rotational angle of the input member is within the target disconnect angle range, as shown in box 356. Separation can occur when the comparison indicates that the rotational angle of the input member is outside of the target disconnect angle range, as shown in box 354, such as when the delay interval has tolled without the received rotational angle of the input member indicating that the input member is within the target disconnect angle range during the delay interval. As will be appreciated by those of skill in the art in view of the present disclosure, separation based upon toll of the delay interval prevents the input member from being inseparable from the drive member in the event that the rotational position sensor fails and/or provides erroneous information during input member rotation.

The methods and systems of the present disclosure, as described above and shown in the drawings, provide for disconnect couplings and generator arrangements with superior properties, including reduced wear from contact between moving and stationary components during disconnect events. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A disconnect coupling, comprising:
a drive member for a generator;
an input member being rotationally engaged with the drive member and having a ramp extending circumferentially about the input member;
an actuator member mechanically engagable with the input member such that rotation of the input member while the actuator member is mechanically engaged with the input member causes the input member to move axially away from and to thereby rotationally disengage from the drive member; and
a controller operably connected to the actuator member and configured to move the actuator member between the disengaged position and the engaged position based upon rotational position of the input member or upon toll of a delay interval.

2. The disconnect coupling as recited in claim 1, wherein the controller is configured to receive a disconnect command, receive a rotational angle of the input member, compare the input member rotational angle with a target disconnect angle range, and determine whether the input member rotational angle is within the target disconnect angle range, and determine whether to disconnect the input member from the drive member based on the comparison of the input member rotational angle and the target disconnect angle range.

3. The disconnect coupling as recited in claim 1, further comprising a rotational position sensor connected to the controller and configured to provide a signal with input member rotational position to the controller.

4. The disconnect coupling as recited in claim 1, further comprising an actuation module connected between the controller and the actuator member to move the actuator member between the disengaged position and engaged positions upon receipt of a disconnect command.

5. The disconnect coupling as recited in claim 1, wherein the controller includes:
a disconnect command lead;
a synchronization block connected to the disconnect command lead;
a delay block connected to the disconnect command lead; and
an operator block connected to the synchronization block and the delay block to provide a disconnect command received from the synchronization block or the delay block to an actuation module operably connected to the actuator module based on input member rotational angle or upon toll of a delay interval.

6. The disconnect coupling as recited in claim 1, wherein the controller is configured to delay disconnection when the input member rotational angle is outside of the target disconnect angle range, and disconnect the input and drive members when the input member rotational angle is within the target disconnect angle range.

7. The disconnect coupling as recited in claim method as recited in claim 1, wherein the controller is configured to delay disconnection when the input member rotational angle is outside of the target disconnect angle range, and disconnect the input member from the drive member after toll of a delay interval.

8. The disconnect coupling as recited in claim 1, wherein the actuator member is frictionally engaged to the input member in an engaged position.

9. The disconnect coupling as recited in claim 1, wherein the actuator member is disconnected from the input member in a disengaged position.

10. The disconnect coupling as recited in claim 1, further comprising a reduction gear arrangement mechanically coupled to the drive member for providing mechanical rotation to the input member.

11. The disconnect coupling as recited in claim 1, further comprising a gas turbine engine mechanically coupled to the drive member to provide mechanical rotation to the input member.

12. A generator arrangement, comprising:
a stator having windings;
a rotor having one or more permanent magnets, bars, and/or windings supported for rotation relative to the stator; and
a disconnect coupling as recited in claim 1, wherein the rotor is seated about the input member and the input member is movable therein.

* * * * *